United States Patent Office 3,334,961
Patented Aug. 8, 1967

3,334,961
PROCESS FOR DYEING OR PRINTING MATERIALS OF FIBROUS STRUCTURE CONTAINING CELLULOSE
Rüdolf Kühne and Fritz Meininger, Frankfurt am Main, Hans Zimmermann, Hofheim, Taunus, Paul Karácsonyi, Frankfurt am Main, Klaus Berner, Hofheim, Taunus, and Johannes Heyna, Frankfurt am Main, Germany, assignors to Farbwerke Hoechst Aktiengesellschaft vormals Meister Lucius & Bruning
No Drawing. Filed Mar. 30, 1966, Ser. No. 538,587
Claims priority, application Germany, Feb. 24, 1961, F 33,272
10 Claims. (Cl. 8—54.2)

This application is a continuation-in-part of our application Ser. No. 325,453 filed Nov. 21, 1963 (now abandoned), which in turn is a continuation-in-part of our application Ser. No. 174,383 filed Feb. 20, 1962 (now abandoned).

The present invention provides a process for dyeing or printing materials of fibrous structure containing cellulose.

We have found that fast dyeings and prints can be produced on materials of fibrous structure containing cellulose by applying to this material a watersoluble organic dyestuff containing at least once the group of the formula

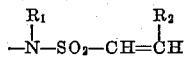

in which $R_1$ represents an alkyl group and $R_2$ represents a hydrogen atom or an alkyl radical and by fixing the dyestuff at normal temperature or by the action of heat in the presence of an agent having an alkaline reaction. In order to obtain a sufficient solubility in water, the dyestuffs used in the present invention contain at least one acid group imparting solubility in water, for example a carboxylic acid group or especially a sulfonic acid group.

As parent dyestuffs there may be used dyestuffs of various classes, for example azine, dioxazine, nitro, stilbene or triphenylmethane dyestuffs, more particularly, however, phthalocyanine dyestuffs, anthraquinone dyestuffs and azo-dyestuffs free from metal or metalliferous azo-dyestuffs.

The dyestuffs used in the process of the present invention can be prepared by reacting carbylsulfate or carbylsulfate homologues with organic dyestuffs containing primary or secondary amino groups treating said intermediates with an alkali at room temperature or at slightly elevated temperature and, in the case of using primary amino groups containing dyestuffs, subsequently alkylating the products first obtained with alkylating agents. They can also be prepared from the corresponding primary products of the dyestuffs. N-alkyl-N-vinylsulfonyl-amino-arylamines of the formula

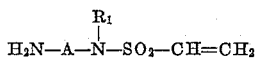

in which A represents an aryl radical and $R_1$ represents an alkyl group may be prepared, for instance by reacting nitroarylamines with carbylsulfate treating said intermediate products with alkalis at room temperature or slightly elevated temperature and subsequent catalytic reduction of the nitro group to the amino group. The compounds so obtained can be used in known manner for the manufacture of the dyestuffs.

The process of this invention can be used for producing dyeings and prints on all kinds of fibrous material containing cellulose, for example on cotton, linen, hemp or regenerated cellulose or on mixtures of the corresponding fibers.

The production of the dyeings is suitably carried out in such a manner that the fibrous material is impregnated with the dyestuffs or dyed in a long liquor according to the direct dyeing method. If the dyestuffs have no affinity or no distinct affinity for the fiber, it is advantageous to impregnate the material in the cold or at a moderately raised temperature with aqueous solutions of the dyestuffs which may contain salt and then squeeze off. The dyestuff solutions may contain inorganic salts, such as alkali metal chlorides or alkali metal sulfates. As agents having an alkaline reaction there are, preferably used inorganic compounds, for example alkali metal hydroxides or alkaline earth metal hydroxides, alkali metal bicarbonates, alkali metal carbonates, alkali metal phosphates, such as trisodium phosphate or mixtures of disodium phosphate and trisodium phosphate, alkali metal borates or alkali metal salts of trichloroacetic acid or mixtures of these alkaline agents.

The fixation of the dyestuffs applied to the fibrous material is effected after the impregnation by subjecting the impregnated material to a heat treatment, if desired, after a previous intermediate drying. The heat treatment can be carried out, for example by steaming or in a heated air current or in an organic solvent at a raised temperature. When the impregnation of the fibrous material is carried out, for example in the presence of an alkali metal hydroxide, the fixation of the dyestuff can also be conducted in the cold or at a moderately raised temperature by allowing the impregnated fibrous material to stand for several hours. When practically neutral impregnation baths containing no agents having an alkaline reaction are used, it is advantageous to fix the dyestuffs on the material by introducing the impregnated material into an alkali bath containing salt and then subjecting it to the heat treatment. By a suitable combination of temperature and pH-value the fixation of the dyestuffs can also be carried out during the dyeing process.

Instead of impregnating or direct dyeing in a long liquor the parent dyestuffs can also be applied to the fibrous material by printing. For this purpose the dyestuffs are mixed with the usual auxiliary agents, for example urea, dispersing agents, thickening agents, such as methyl cellulose, starch ether, alginate thickenings or emulsion thickenings and one of the above-mentioned agents having an alkaline reaction and printed on the material. There may also be used practically neutral printing pastes containing no agents having an alkaline reaction. When such printing pastes are used, the material is treated with an alkaline agent before or after the printing process. The fixation of the dyestuffs is effected by a heat treatment of the printed material, preferably in the presence of steam.

By the process of the present invention there are produced in a simple manner on materials of fibrous structure containing cellulose valuable intense dyeings and prints which are distinguished by high fastness properties, especially by a very good fastness to washing. The novel dyestuffs used according to the present invention which contain the grouping

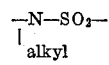

are further distinguished by superior color strength, brilliancy of tint and fastness to weak alkali of the cotton dyeings over known dyestuffs, especially dyestuffs of similar structure containing the group

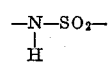

Moreover, the dyestuffs employed in the present process are far superior to known dyestuffs containing groups of the formula

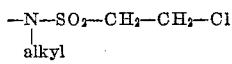

with regard to the tinctorial strength and the building up (proportionality between tinctorial strength and amounts of dyestuff used) of the dyeings on cotton fabric.

The following examples serve to illustrate the invention but they are not intended to limit it thereto, the parts being by weight unless otherwise stated, and the relationship of parts by weight to parts by volume being the same as that of the kilogram to the liter.

*Example 1*

20 parts of the dyestuff coresponding in the form of its free acid to the formula

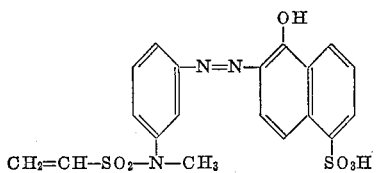

(obtainable by coupling diazotized 3-(N-methyl-vinyl-sulfinylamino)-1-aminobenzene with 1-hydroxynaphthalene-5-sulfonic acid) and 5 parts of sodium hydroxide are dissolved in 1000 parts by volume of water. In the dyebath so obtained cotton fabric is impregnated at 20° C. After the impregnation the fabric is squeezed off to an increase of weight of about 80%. The material is then rolled on a roller, wrapped in a foil and left on the roller while turning the latter for about 16 hours at a temperature between 18° C. and 25° C. The material is then neutralized, rinsed in boiling water and dried. A clear red dyeing having good fastness properties, especially a good fastness to washing, is obtained.

A similar dyeing is obtained by using instead of sodium hydroxide the corresponding amount of potassium hydroxide or instead of the above-mentioned dyestuff 20 parts of a dyestuff corresponding in the form of its free acid to the following formula

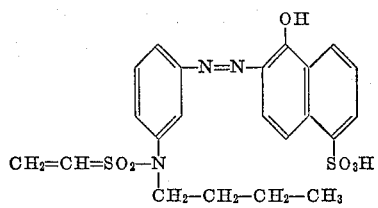

(obtainable by coupling diazotized 3-(N-n-butyl-vinylsulfonylamino)-1-aminobenzene with 1-hydroxynaphthalene-5-sulfonic acid).

*Example 2*

A linen fabric is impregnated with a dyestuff solution containing in 1000 parts by volume of water 20 parts of a dyestuff corresponding in the form of its free acid to the following formula

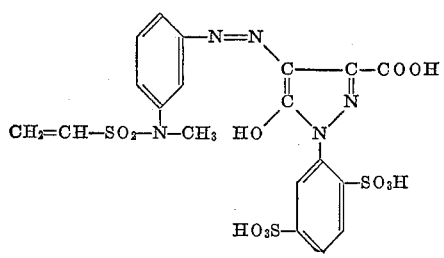

(obtainable by coupling diazotized 3-(N-methyl-vinylsulfonylamino) - 1-aminobenzene with 1-(2',5'-disulfophenyl)-5-pyrazolone-3-carboxylic acid). After the impregnation the surplus liquid is squeezed off in a manner such that the material retains about 80% of its weight of the dyestuff solution. The material is then supplied to a jigger and treated for one hour at 40° C. in a bath containing 300 parts of sodium chloride and 5 to 10 parts of sodium hydroxide in 1000 parts by volume of water, the ratio of liquor being calculated so that per 1 part of material 3 parts by volume of liquor are used. The dyed linen fabric is then neutralized, rinsed with boiling water and dried. A clear yellow dyeing of very good fastness to washing is obtained.

By using instead of the above-mentioned dyestuff 20 parts of a dyestuff corresponding in the form of its free acid to the following formula

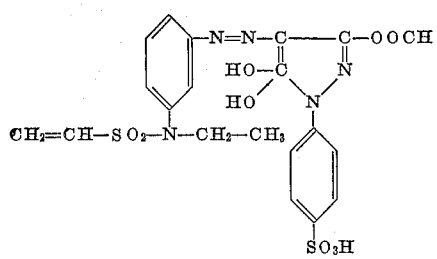

(obtainable by coupling diazotized 3-(N-ethyl-vinylsulfonylamino)-1-aminobenzene with 1-(4'-sulfophenyl)-5-pyrazolone-3-carboxylic acid), or 20 parts of a dyestuff corresponding to the formula

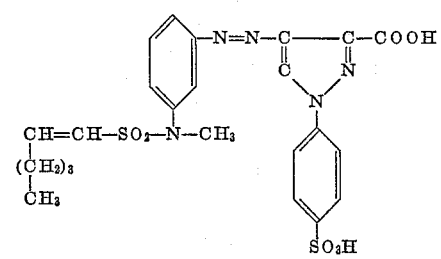

(obtainable by coupling diazotized 3-[N-methyl-(2'-n-butyl-vinylsulfonylamino)] - 1-aminobenzene with 1-(4'-sulfophenyl)-5-pyrazolone-3-carboxylic acid) and working otherwise as described above, yellow dyeings possessing similar good properties of fastness are obtained.

*Example 3*

83.5 parts of viscose rayon fabric are treated for one hour at 20° C., while agitating well, with 1000 parts by volume of a bath containing 2.5 parts of the dyestuff of the formula

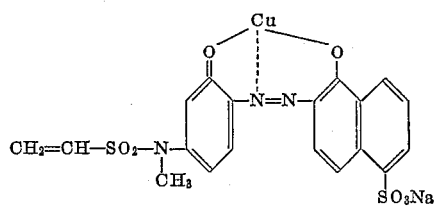

(obtainable by oxidizing coppering the azo-dyestuff from diazotized 4-(N-methyl-vinylsulfonylamino) - 1-aminobenzene and 1-hydroxynaphthalene-5-sulfonic acid), 50 parts of sodium sulfate and 10 parts of sodium hydroxide. The dyeing is then rinsed at the boil and dried. An intense claret dyeing of good fastness to washing is obtained.

Dyeings of similar properties are obtained when dyeing is carried out with the same amounts of dyestuff and sodium sulfate and the same duration of treatment, but instead of 10 parts of sodium hydroxide 1 part of sodium hydroxide at 40° C. or 0.5 part of sodium hydroxide or 10 parts of trisodium phosphate at 60° C. or 5 parts of sodium carbonate at 80° C. or 1 part of sodium carbonate at 95° C. are used.

Example 4

A mercerized cotton fabric is impregnated with a dyestuff solution containing in 1000 parts by volume of water 20 parts of the dyestuff obtainable by reacting copperphthalocyanine-tetrasulfochloride with 4-(N-methyl-vinylsulfonylamino)-1-aminobenzene. After the impregnation the fabric is squeezed off to an absorption of liquor of about 80%. The material so impregnated is dried and treated at room temperature with an aqueous alkaline salt solution containing per liter 250 grams of sodium chloride and 10 grams of sodium hydroxide. After squeezing off (increase of weight of 80%) the material is steamed for 30 seconds at 100° to 102° C., neutralized, rinsed at boiling temperature and dried.

A full, brilliant turquoise blue dyeing of good to very good properties of fastness is obtained.

Example 5

A cotton fabric is impregnated as described in Example 1 with a dyestuff solution containing in 1000 parts by volume of water 20 parts of the dyestuff corresponding to the formula

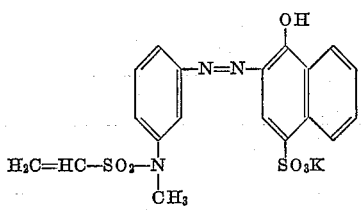

(obtainable by coupling diazotized 3-(N-methyl-vinylsulfonylamino)-1-aminobenzene with 1-hydroxynaphthalene-4-sulfonic acid) and 5 parts of sodium hydroxide. The fabric squeezed off to an increase of weight of about 80% is heated for 3 minutes in dichlorobenzene at 140° C. and then rinsed with methanol and water. After rinsing in boiling water and drying, an orange dyeing of very good fastness to washing is obtained.

Example 6

20 parts of a dyestuff corresponding in the form of its free acid to the following formula

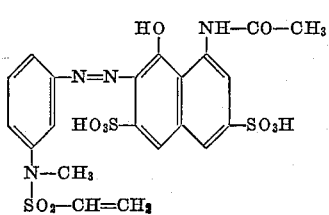

(obtainable by coupling diazotized 3-(N-methyl-vinylsulfonylamino) - 1-aminobenzene with 1-acetylamino-8-hydroxynaphthalene-3,6-disulfonic acid) are dissolved with 50 parts of urea in 200 parts of hot water. To the solution obtained there are added, while stirring, 400 parts of a thickening consisting of 40 parts of sodium alginate and of 960 parts of water, and 20 parts of sodium bicarbonate. The paste is then made up to 1000 parts by adding water and thickening.

A cotton fabric is printed with the printing paste so obtained. After drying it is steamed for 5 minutes at 101° C. to 103° C., rinsed with cold and then with hot water, soaped at the boil, rinsed again and dried. A red print of very good fastness to wet processing is obtained.

Example 7

From 20 parts of the dyestuff corresponding to the formula

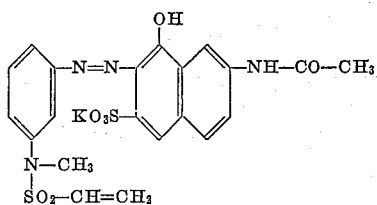

(obtainable by coupling diazotized 3-(N-methyl-vinylsulfonylamino) - 1-aminobenzene with 7-acetylamino-1-hydroxynaphthalene-3-sulfonic acid) a printing paste is prepared in the manner described in Example 6, which contains instead of sodium bicarbonate 20 parts of sodium carbonate. With the printing paste so obtained a cotton fabric is printed as described in Example 6. A full, orange printing pattern fixed on the material fast to boiling is obtained.

Example 8

From 20 parts of the dyestuff corresponding to the formula

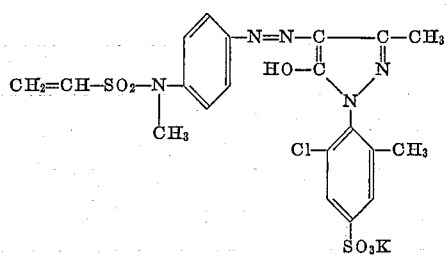

(obtainable by coupling diazotized 4-(N-methyl-vinylsulfonylamino)-1-aminobenzene with 1-(2'-methyl-6'-chloro-4'-sulfophenyl)-3-methyl-5-pyrazolone) a printing paste is prepared in the manner described in Example 6, which contains instead of sodium bicarbonate 10 parts of sodium hydroxide solution of 38° Bé. With this printing paste a cotton fabric is printed. After drying it is steamed for 5 minutes at 101° C. to 103° C. and aftertreated as described in Example 6. A yellow print of very good fastness to wet processing is obtained.

By using instead of sodium hydroxide solution 40 parts of the sodium salt of trichloroacetic acid, a yellow print possessing a good fastness to wet processing is likewise obtained.

Example 9

20 parts of a dyestuff corresponding in the form of its free acid to the following formula

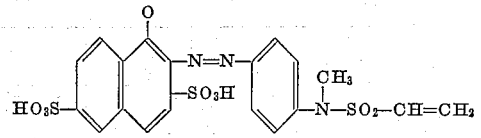

(obtainable by coupling diazotized 4-(N-methyl-vinylsulfonylamino)-1-aminobenzene with 1-hydroxynaphthalene-3,6-disulfonic acid) are mixed with water, urea and thickening in the manner described in Example 6, while using instead of 20 parts of sodium bicarbonate 15 parts of potassium carbonate. By further proceeding as described in that example, a brillant scarlet printing pattern possessing a very good fastness to wet processing is obtained.

Example 10

20 parts of the dyestuff corresponding to the formula

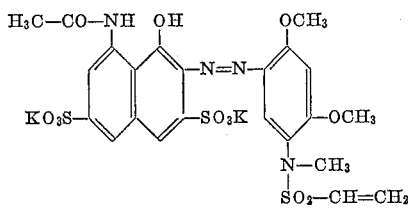

(obtainable by coupling diazotized 3-(N-methyl-vinylsulfonylamino)-1-amino-4,6-dimethoxybenzene with 1-acetylamino-8-hydroxynaphthalene-3,6-disulfonic acid) are dissolved with 50 parts of urea in 200 parts of hot water. To the solution obtained there are added, while stirring, 400 parts of a thickening consisting of 80 parts of alginate and of 920 parts of water, and 20 parts of sodium carbonate. The paste is then made up to 1000 parts by adding water and thickening. With the printing paste so obtained the material is printed. After drying it is steamed for 5 minutes at 101° C. to 103° C. and aftertreated as described in Example 6. On cotton, staple fiber of regenerated cellulose and on viscose a bluish violet print of very good fastness to wet processing is obtained.

Example 11

40 parts of the dyestuff of the formula

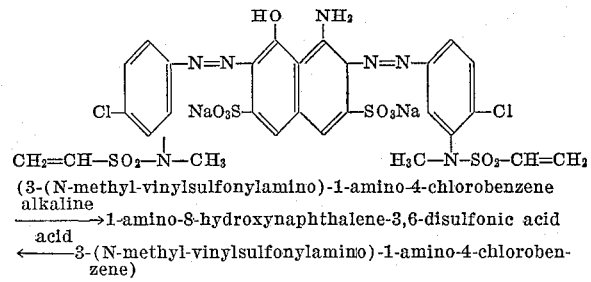

(3-(N-methyl-vinylsulfonylamino)-1-amino-4-chlorobenzene
$\xrightarrow{\text{alkaline}}$ 1-amino-8-hydroxynaphthalene-3,6-disulfonic acid
$\xleftarrow{\text{acid}}$ 3-(N-methyl-vinylsulfonylamino)-1-amino-4-chlorobenzene)

are dissolved with 50 parts of urea in 200 parts of hot water, and 400 parts of a neutral sodium alginate thickening consisting of 40 parts of sodium alginate and 960 parts of water are added. 25 parts of sodium carbonate are then added and the whole is made up to 1000 parts by adding water and thickening. With the printing paste so prepared a fast black cotton print is obtained in the manner described in Example 6.

In a manner similar to that disclosed in the preceding examples there are obtained with the dyestuffs indicated in the following table dyeings and prints on cotton which possess the same good properties of fastness.

| | Constitution | Tint |
|---|---|---|
| (1) | ![structure 1] | Clear scarlet. |
| (2) | ![structure 2] | Blue. |
| (3) | ![structure 3] | Green. |
| (4) | ![structure 4] | Red-violet. |

| | Constitution | Tint |
|---|---|---|
| (5) | 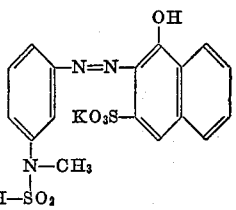 | Clear orange. |
| (6) | 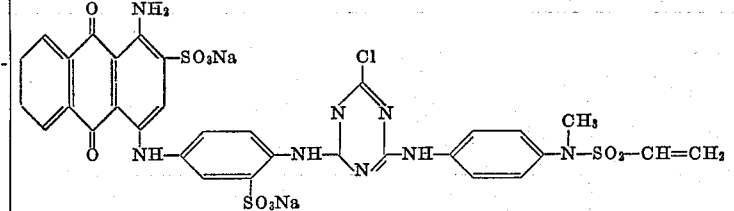 | Blue. |
| (7) | 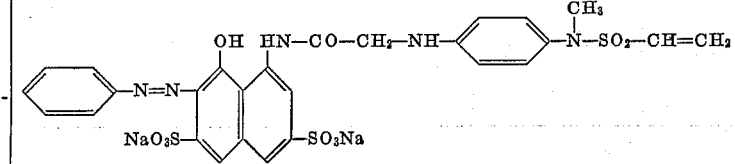 | Red. |
| (8) | Pc—(SO$_2$—NH—⟨⟩—N(CH$_3$)—SO$_2$—CH=CH$_2$)$_2$<br>(SO$_3$Na)$_2$<br>(Pc=copper-phthalocyanine nucleus) | Turquoise. |
| (9) | 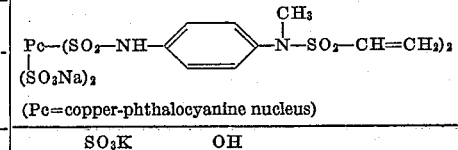 | Orange. |
| (10) | 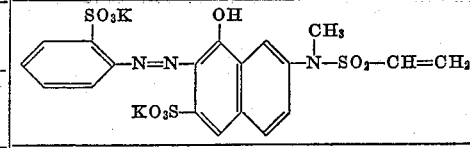 | Red. |
| (11) | 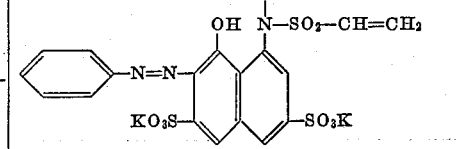 | Violet. |
| (12) | 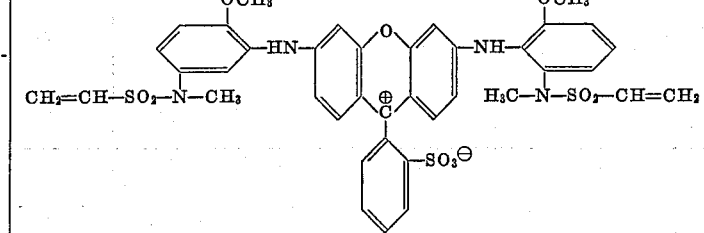 | Blue. |
| (13) | 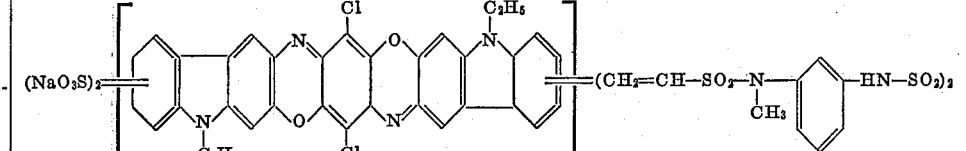 | Violet. |

| | Constitution | Tint |
|---|---|---|
| (14) | [structure: anthraquinone with NH2, SO3Na, linked via NH-phenyl-NH-triazine(OCH3)-NH-phenyl-N-pyrazolone (OH, COONa) azo phenyl-N(CH3)-SO3-CH=CH2] | Green. |
| (15) | CH3—CO—HN— [naphthol with OH, SO3K]—N=N— [phenyl with CH3, N(C2H5)SO2—CH=CH2] | Scarlet. |
| (16) | [naphthol OH, SO3K]—N=N— [2,6-dimethylphenyl-N(CH3)SO2—CH=CH2] | Scarlet. |
| (17) | [naphthol OH, SO3K]—N=N— [phenyl with CH3, OCH3, N(CH3)SO2—CH=CH2] | Scarlet. |
| (18) | C6H5—CO—NH— [naphthol OH, KO3S, SO3K]—N=N— [2,6-dimethylphenyl-N(CH3)SO2—CH=CH2] | Red-violet. |
| (19) | CH3—CO—NH— [naphthol OH, SO3K]—N=N— [phenyl-N(CH3)SO2—CH=CH2] | Clear scarlet. |
| (20) | [naphthol OH, SO3K]—N=N— [phenyl-N(CH3)SO2—CH=CH2] | Clear scarlet. |
| (21) | [phenyl-OH, N(CH3)SO2—CH=CH2]—N=N—C(pyrazolone HO-C, N, C—CH3, N—phenyl(Cl, CH3, SO3K))  cobalt complex | Yellow-brown. |
| (22) | [phenyl OH, N(CH3)SO2—CH=CH2 ]—N=N—[naphthol OH, KO3S, —NH—phenyl—COOK]  chromium complex | Navy blue. |

| | Constitution | Tint |
|---|---|---|
| (23) | 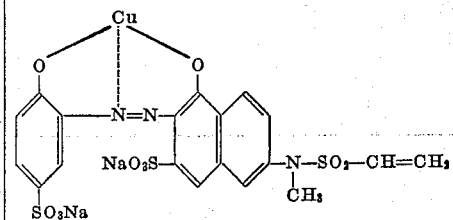 | Claret. |
| (24) | 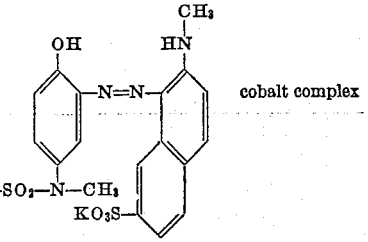 cobalt complex | Grey. |
| (25) | 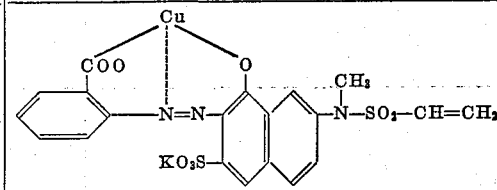 | Red-brown. |
| (26) | 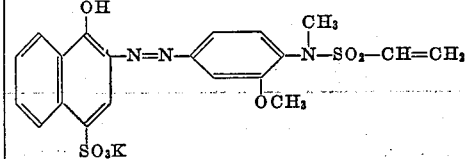 | Scarlet. |
| (27) | 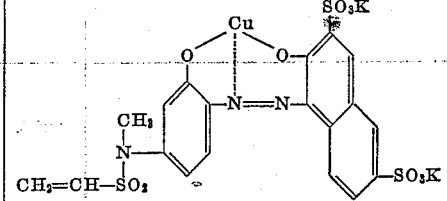 | Claret. |
| (28) | 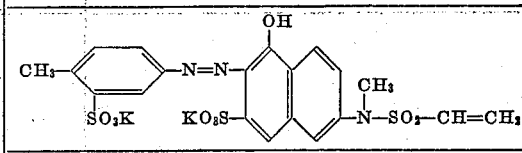 | Orange. |
| (29) | 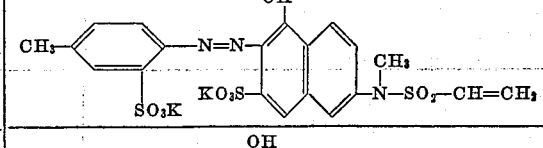 | Scarlet. |
| (30) | 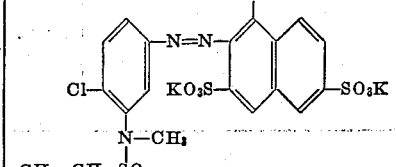 | Orange. |
| (31) | 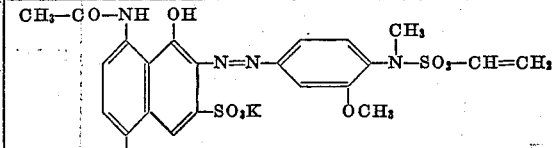 | Red. |

| | Constitution | Tint |
|---|---|---|
| (32) | Naphthalene with OH, KO$_3$S, SO$_3$K, -N=N- linked to phenyl with OCH$_3$ and N(CH$_3$)-SO$_2$-CH=CH$_2$ | Scarlet. |
| (33) | Anthraquinone with NH$_2$, SO$_3$K, and NH-phenyl-N(CH$_3$)-SO$_2$-CH=CH$_2$ | Blue. |
| (34) | Cu-complex azo dye: KO$_3$S, Cl on phenyl; -N=N-; naphthyl with KO$_3$S and N(CH$_3$)-SO$_2$-CH=CH$_2$ | Ruby red. |
| (35) | Phenyl with N(CH$_3$)-SO$_2$-CH=CH$_2$; -N=N-; naphthyl with OH, KO$_3$S, N(CH$_3$)-SO$_2$-CH=CH$_2$ | Brilliant orange. |
| (36) | Naphthyl with CH$_3$-CO-NH, OH, KO$_3$S; -N=N-; phenyl-O-phenyl-N(CH$_3$)-SO$_2$-CH=CH$_2$ | Bluish red. |
| (32) | Phenyl-O-phenyl(SO$_3$K)-N=N-phenyl(OH, KO$_3$S, N(CH$_3$)-SO$_2$-CH=CH$_2$) | Scarlet. |
| (38) | Cu-complex: CH$_2$=CH-SO$_2$-N(CH$_3$)-phenyl-O-Cu-NH-phenyl-SO$_3$K, NH$_2$; -N=N- | Red-brown. |
| (39) | Cu-complex: CH$_3$-CO-NH-naphthyl(O, SO$_3$K)-N=N-phenyl(N(CH$_3$)-SO$_2$-CH=CH$_2$) | Claret. |
| (40) | Cu-complex: CH$_3$-CO-HN-naphthyl(O, SO$_3$K)-N=N-phenyl(O, N(CH$_3$)-SO$_2$-CH=CH$_2$) | Red-violet. |

| | Constitution | Tint |
|---|---|---|
| (41) | 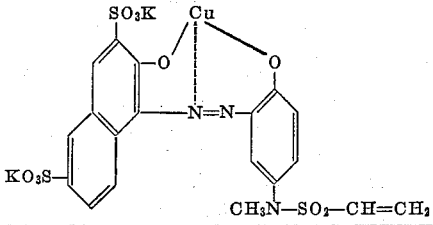 | Red-violet. |
| (42) | 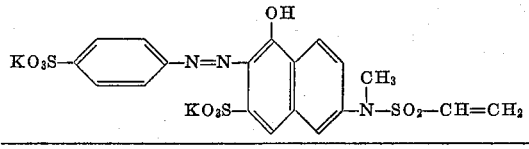 | Brilliant orange. |
| (43) | 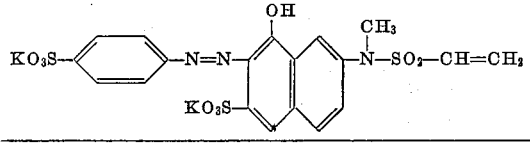 | Reddish orange. |
| (44) | 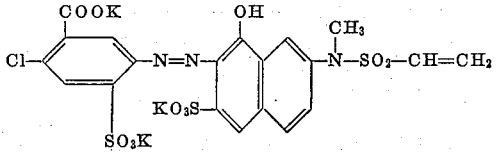 | Orange. |

*Example 12*

20 parts of the dyestuff of the formula

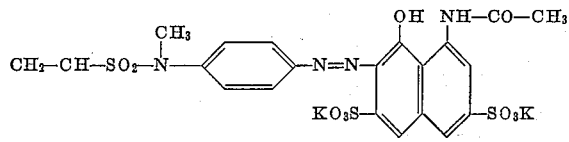

(obtainable by coupling diazotized 4-(N-methyl-vinyl-sulfonylamino) - 1 - aminobenzene with 8-acetylamino-1-hydroxynaphthalene-3,6-disulfonic acid) are dissolved with 50 parts of urea in 200 parts of hot water. 400 parts of an aqueous starch-ether-thickening of 10% by weight and 40 parts of trisodium phosphate are then added. The paste so obtained is made up to 1000 parts by adding water and thickening. After printing, fixing and finishing in the manner described in Example 6, a printing pattern of very good fastness to washing is obtained on cellulose or on fibers of regenerated cellulose.

*Example 13*

20 parts of the dyestuff corresponding to the formula

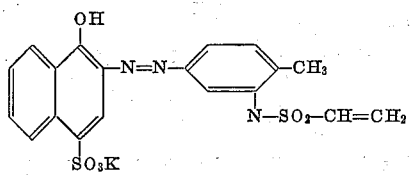

(obtainable by coupling diazotized 3-(N-methyl-vinyl-sulfonylamino)-1-aminobenzene with 1-hydroxynaphtha-lene-4-sulfonic acid) are dissolved with 50 parts of urea in 200 parts of hot water. To the solution obtained 400 parts of an aqueous alginate thickening of 8% by weight being resistant to alkalies and 20 parts of sodium carbonate are added, while stirring. The mixture is then made up to 1000 parts by adding water and thickening. With the printing paste so obtained a cellulose fabric is printed. The fixation of the dyestuff is effected by a dry heat treatment for 3 minutes at 140° C. After finishing by soaping at the boil and rinsing, a brilliant orange print having a very good fastness to wet processing is obtained.

Prints of similar good properties are obtained by using instead of the above-mentioned dyestuff 17 parts of the dyestuff corresponding to the formula

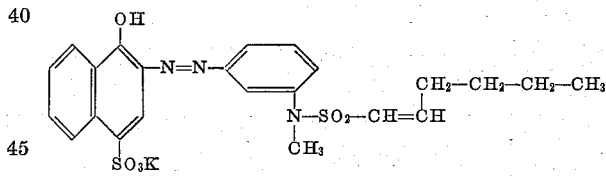

(obtainable by coupling diazotized 3-amino-[N-methyl-(n-hexenyl-sulfonylanilide)] with 1-hydroxynaphthalene-4-sulfonic acid).

*Example 14*

A cotton fabric is impregnated with a solution of 20 parts of sodium hydroxide solution of 38° Bé. in 1000 parts of water, squeezed off and dried. On the material prepared in this manner a printing paste of the following composition is printed: 20 parts of the dyestuff described in Example 6, 50 parts of urea, 400 parts of an aqueous alginate thickening of 4% by weight, 530 parts of water.

After drying the fabric is steamed for 5 minutes at 101° C. to 103° C. and finished in the usual manner by rinsing and soaping. A red print of a very good fastness to wet processing is obtained.

*Example 15*

20 parts of the dyestuff corresponding to the formula

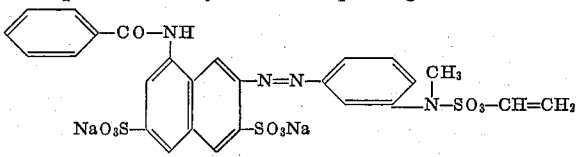

(obtainable by coupling diazotized 3-(N-methyl-vinyl-sulfonylamino)-1-aminobenzene with 1-benzoylamino-8-hydroxynaphthalene - 3,6 - disulfonic acid) are dissolved with 50 parts urea in 200 parts of hot water and, while stirring, an aqueous neutral alginate thickening is added. With the printing paste so obtained a cotton fabric is printed and, after drying, it is passed through a padding liquor consisting of 30 parts of sodium hydroxide solution of 38° Bé., 250 parts of sodium chloride and 1000 parts of water. The material is then squeezed off to an absorption of liquor of about 80% and then steamed for 20 seconds. After rinsing and soaping a brilliant red print possessing a very good fastness to wet processing is obtained.

A print of similar good fastness properties is obtained by using a padding liquor of the following composition: 5 parts of sodium hydroxide solution of 38° Bé., 100 parts of sodium chloride, 150 parts of sodium carbonate, 50 parts of potassium carbonate and 1 part of stabilized hydrosulfite in 1000 parts by volume of padding liquor.

Instead of by steaming the dyestuff can also be fixed by thermofixation at 140° C. or by a passage at 118° C. through a bath saturated with potassium nitrate.

Example 16

20 parts of the dyestuff corresponding to the formula

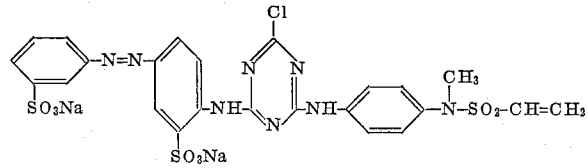

(obtainable by reacting the primary condensation product of cyanuric chloride and 4-(N-methyl-vinylsulfonylamino)-1-aminobenzene with 4-amino-1,1'-azobenzene-3,3'-disulfonic acid) are dissolved with 50 parts of urea in 200 parts of hot water. To the dyestuff solution so obtained 500 parts of an emulsion thickening and 30 parts of sodium bicarbonate are added, while stirring. The whole is then made up to 1000 parts by adding water and thickening. The emulsion thickening is prepared by mixing 450 parts of an aqueous alginate thickening of 4% by weight, 10 parts of an emulsifier, for example the condensation product of polyglycol and fatty acid, and 240 parts of water and 300 parts of heavy benzene. With the printing paste so obtained a cotton fabric is printed. After drying it is steamed and finished in the manner described in Example 6. A yellow print of very good fastness to boiling is obtained.

Example 17

25 parts of the dyestuff corresponding to the formula

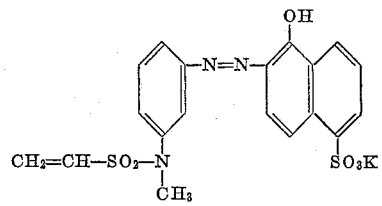

(obtainable by coupling diazotized 3-(N-methyl-vinylsulfonylamino) - 1 - aminobenzene with 1-hydroxynaphthalene-5-sulfonic acid) are dissolved with 50 parts of urea in 250 parts of hot water, and 400 parts of an alginate thickening of 8% by weight being resistant to alkalies are added. After the addition of 20 parts of sodium carbonate the printing paste is made up to 1000 parts by adding water and thickening. After printing and drying the material is steamed for 10 minutes in a continuous steamer at 101° C. to 103° C., then it is rinsed cold and hot, soaped at the boil with a solution of 3 parts of Marseilles soap in 1000 parts by volume of water, and rinsed again hot and cold. On viscose rayon a brilliant scarlet print having a very good fastness to washing is obtained.

Example 18

20 parts of the dyestuff described in Example 5 are dissolved with 50 parts of urea in 250 parts of hot water. After the addition of 400 parts of an alginate thickening of 8% by weight being resistant to alkalies, 20 parts of potassium bicarbonate, are introduced, while stirring. The whole is then made up to 1000 parts by adding water and thickening. After printing on cotton the material is dried, thermofixed for 5 minutes at 140° C. and aftertreated in the manner described in Example 17. A yellowish orange print having a very good fastness to wet processing is obtained.

Example 19

From 20 parts of the dyestuff corresponding to the formula

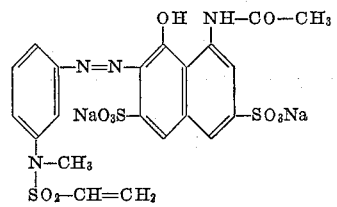

(obtainable by coupling diazotized 3-(N-methyl-vinylsulfonylamino)-1-aminobenzene with 8-acetylamino-1-hydroxynaphthalene-3,6-disulfonic acid) a printing paste is prepared in the manner described in Example 18, printed on cotton and thermofixed. A red printing pattern possessing a very good fastness to wet processing is obtained.

Example 20

A cotton fabric is dyed with 20 parts of the dyestuff of the formula

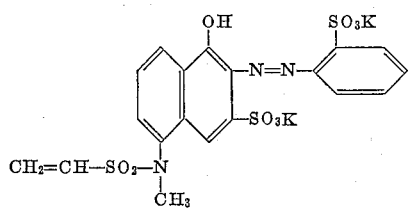

(obtainable by coupling diazotized 1-aminobenzene-2-sulfonic acid with 6-(N-methyl-vinylsulfonylamino)-1-hydroxynaphthalene-3-sulfonic acid) in the manner described in Example 1. A clear orange dyeing possessing good properties of fastness, especially a very good fastness to wet processing is obtained.

Example 21

A linen fabric is dyed with 20 parts of the dyestuff corresponding to the formula

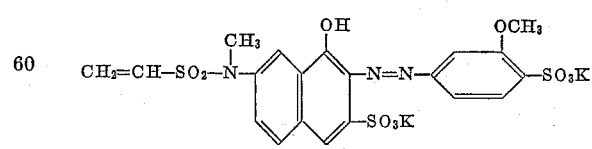

(obtainable by coupling diazotized 1-amino-2-methoxybenzene-4-sulfonic acid with 7-(N-methyl-vinylsulfonylamino) - 1 - hydroxynaphthalene-3-sulfonic acid) in the manner described in Example 2. A clear yellowish red dyeing possessing a very good fastness to wet processing is obtained.

We claim:
1. A process for producing dyeings fast to wet processing on materials of fibrous structure containing cellulose which comprises applying to this material water-soluble azo-dyestuffs, phthalocyanine dyestuffs, anthraquinone dyestuffs, triphenylmethane dyestuffs or dioxazine dyestuffs containing at least once the group of the formula

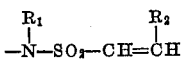

wherein $R_1$ represents a lower alkyl group and $R_2$ represents hydrogen or lower alkyl and which further contains at least one sulfonic acid or carboxylic acid group and fixing the dyestuffs on the material in the presence of agents having an alkaline reaction.

2. A process as defined in claim 1, wherein the dyestuffs are fixed on the material at ordinary temperature.

3. A process as defined in claim 1, wherein the dyestuffs are fixed on the material by the action of heat.

4. A process as defined in claim 1, wherein inorganic compounds selected from the group consisting of alkali metal hydroxides, alkaline-earth metal hydroxides, alkali metal bicarbonates, alkali metal carbonates, alkali metal phosphates, alkali metal borates, alkali metal salts of trichloroacetic acid and mixtures of these componnds are used as agents having an alkaline reaction.

5. A process as defined in claim 1, wherein an organic dyestuff of the following formula

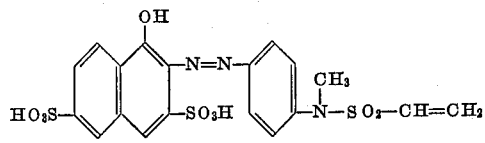

is used.

6. A process as defined in claim 1, wherein an organic dyestuff of the following formula

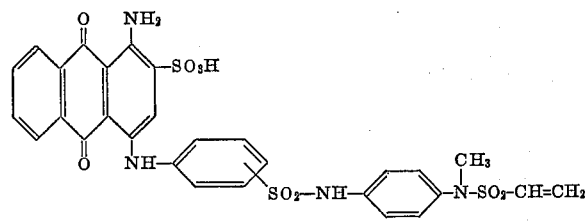

is used.

7. A process as defined in claim 1, wherein an organic dyestuff of the following formula

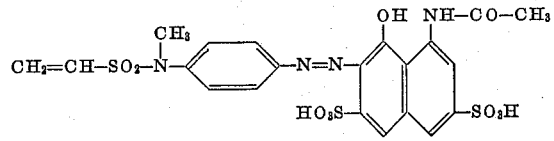

is used.

8. A process as defined in claim 1, wherein an organic dyestuff of the following formula

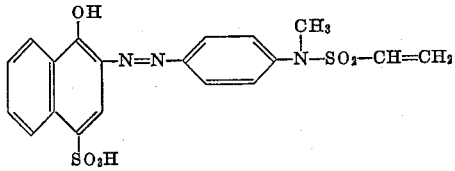

is used.

9. A process as defined in claim 1, wherein an organic dyestuff of the following formula

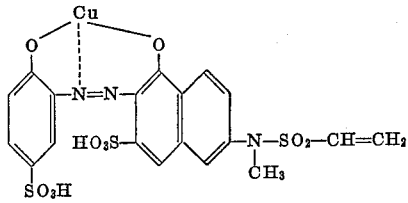

is used.

10. A process as defined in claim 1, wherein an organic dyestuff of the following formula

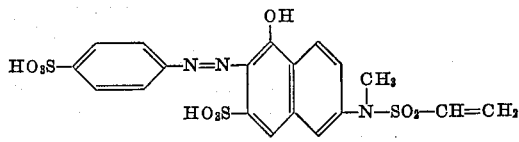

is used.

References Cited

UNITED STATES PATENTS

| | | | |
|---|---|---|---|
| 2,784,204 | 3/1957 | Heyna et al. | 260—397.6 |
| 2,991,280 | 7/1961 | Schetty et al. | 260—198 X |
| 3,135,730 | 6/1964 | Heyna et al. | 260—147 |
| 3,197,456 | 7/1965 | Kuhne et al. | 8—54.2 |

OTHER REFERENCES

Review of Textile Progress, 1959, vol. 11, pp. 228–230, pub. 1960 by Butterworth & Co., Washington, D.C., TS 1300 R4 C.

Derwent, Belgian Patent Reports, No. 64B, p. C13, May 27, 1960; ref. Belgian Patent No. 583,430.

Derwent, Belgian Patents Report, No. 66A, p. C8, July 15, 1960; ref. Belgian Patent No. 584,802.

NORMAN G. TORCHIN, *Primary Examiner.*

T. J. HERBERT, *Assistant Examiner.*